United States Patent
Yamauchi et al.

(10) Patent No.: US 7,220,787 B2
(45) Date of Patent: May 22, 2007

(54) PHOTOREACTIVE HOT-MELT ADHESIVE COMPOSITION

(75) Inventors: Kenji Yamauchi, Tsukuba (JP); Takashi Shinjo, Osaka (JP); Takeshi Miyake, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 11/244,960

(22) Filed: Oct. 6, 2005

(65) Prior Publication Data

US 2006/0030635 A1 Feb. 9, 2006

Related U.S. Application Data

(63) Continuation of application No. 10/221,849, filed as application No. PCT/JP02/00169 on Jan. 15, 2002, now abandoned.

(30) Foreign Application Priority Data

Jan. 15, 2001 (JP) ............... 2001/6563
Feb. 28, 2001 (JP) ............... 2001/54576

(51) Int. Cl.
*C08F 2/46* (2006.01)
*C08F 2/50* (2006.01)
(52) U.S. Cl. ............ 522/100; 522/170; 522/104; 522/134; 522/143; 522/158; 522/178; 522/179; 522/181; 428/355 EP; 427/207.1; 427/208
(58) Field of Classification Search ............ 522/100, 522/170, 104, 134, 143, 146, 168, 178, 179, 522/181; 428/355 EP; 427/207.1, 208
See application file for complete search history.

(56) References Cited

U.S. PATENT DOCUMENTS 6,015,865 A * 1/2000 Blank et al. ............ 525/524

FOREIGN PATENT DOCUMENTS

EP 0276716 * 8/1988
JP 11043661 * 2/1999

* cited by examiner

*Primary Examiner*—Sanza L. McClendon
(74) *Attorney, Agent, or Firm*—Townsend & Banta

(57) ABSTRACT

It is an object to provide a photoreactive hot-melt adhesive composition which exhibits high adhesive strength immediately after combination of adherends and excellent bond strength after completion of curing and provides a highly durable bonded laminate.

A photoreactive hot-melt adhesive composition containing:
(a) a bisphenol F epoxy resin that assumes a solid form at ordinary temperature;
(b) at least one compound selected from the group consisting of a compound represented by the following formula (1), a copolymer of tetramethylene oxide and ethylene oxide and a copolymer of tetramethylene oxide and propylene oxide; and
(c) a cationic photoinitiator;

$$R1\text{-}(OR2)_n\text{---}OR3 \qquad \text{Formula (1)}$$

(In the formula, R1 and R3 independently represent any of a hydrogen atom, a glycidyl group, and a monofunctional substituted or unsubstituted hydrocarbon group having 1–8 carbon atoms; R2 represents a bifunctional, substituted or unsubstituted hydrocarbon group having 2–8 carbon atoms; and n is an integer of 2 or larger. In $(OR2)_n$, R2's of OR2's may be all identical to or different from each other).

5 Claims, No Drawings

PHOTOREACTIVE HOT-MELT ADHESIVE COMPOSITION

This is a continuation application of U.S. application Ser. No. 10/221,849, filed Feb. 28, 2003, now abandoned which is based on an international application No. PCT/JP02/00169 with an international filing date of 15 Jan. 2002.

TECHNICAL FIELD

The present invention relates to a photoreactive hot-melt adhesive composition which is applicable by a melt coating technique and undergoes curing upon exposure to a radiation, and more particularly to a photoreactive hot-melt adhesive composition which provides a cured product having superior durability.

BACKGROUND ART

Conventionally, hot-melt adhesives have been widely used to bond various adherends for their solvent-free nature and excellence in environmental resistance. Also, various types of photoreactive hot-melt adhesive compositions have been recently proposed which are applied by melt coating and then cured by irradiation. These types of hot-melt adhesive compositions are caused to cure by irradiation to finally exhibit high bond strength.

As one group of such compositions, a variety of photoreactive hot-melt adhesive compositions has been proposed which utilizes a ring-opening reaction of an epoxy resin.

For example, Japanese Patent Laying-Open No. Hei 11-5964 discloses a photoreactive hot-melt adhesive composition which contains an epoxy resin, a thermoplastic resin and a cationic photoinitiator.

Japanese Patent Laying-Open No. Hei 11-116929 discloses a photoreactive hot-melt adhesive composition which contains an epoxy compound as a cationically polymerizable compound, a cationic photoinitiator, and a stabilizer composed of a compound having a sulfur atom and a phenol group in a molecule.

Japanese Patent Laying-Open No. 2000-8015 discloses a photoreactive hot-melt adhesive which contains an epoxy compound having an alicyclic epoxy group and an epoxy group other than the alicyclic epoxy group, a compound having a phenolic OH group, and a cationic photo initiator. The epoxy compound has, on average, two or more of the structure represented by the following formula (6):

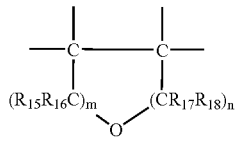

Formula (6)

(in the formula (6), m and n are independently 0, 1 or 2; and $R_{15}$, $R_{16}$, $R_{17}$ and $R_{18}$ independently represent a methyl, ethyl, isopropyl, isoamyl or phenyl group or a hydrogen atom).

These photoreactive hot-melt adhesives are all designed to develop high bond strength through a ring-opening polymerization of an epoxy group. Also, selection in type of the epoxy compound or inclusion of a phenol-containing compound has been attempted to achieve improvements in bond strength or heat resistance after cure. Adherends are bonded together by these photoreactive hot-melt adhesives which are subsequently cured. However, when the bonded laminate after completion of curing is immersed in water, separation likely occurs at adherend-adhesive interfaces, which has been a problem.

In Japanese Patent Laying-Open No. Sho 63-248825, a curable composition is disclosed which comprises an epoxy resin, a UV catalyst and an interlocking agent containing a poly(alkylene oxide) residue portion. This reference describes that the composition, because of its tendency to show retarded curing after exposure to a UV radiation, can serve as an adhesive or bond opaque substrates during an open time after the exposure, for example. However, no description is provided in this prior art as to the water resistance or the like of the bonded laminate.

In Japanese Patent Laying-Open No. Hei 6-306346, an epoxy/polyester based hot-melt composition is disclosed which contains polyester that assumes a solid form at ordinary temperature, an epoxy resin, and a cationic photoinitiator. Due to the incorporation of the polyester that assumes a solid form at ordinary temperature, the adhesive reveals high strength immediately after lamination. This is described to eliminate the need of a clamping or other provisional fixing operation before curing completes. However, in the case where the composition excludes the solid polyester and incorporates the solid epoxy resin and the photoinitiator or where the composition incorporates the solid epoxy resin and the photoinitiator and further a low molecular weight hydroxyl-containing material, the adhesive according to this prior reference is described to reveal low strength immediately after lamination. Also, this prior reference lacks description as to water resistance or the like of the bonded laminate.

In general, it is not required that a cationically photoreactive hot-melt adhesive be irradiated continually until it is fully cured. That is, once such an adhesive is irradiated, curing proceeds by a dark reaction in which radiation-generated cationic active species participate. Accordingly, a cationically photoreactive hot-melt adhesive is often used where adherends once laminated by an adhesive prevent passage of a radiation through them and thus prevent exposure of the adhesive to a radiation, e.g., where opaque adherends are laminated together.

Although curing proceeds substantially by a dark reaction, a large number of cationic active species is generated in an exposed surface layer portion of the adhesive. This increases a tendency of the adhesive to form a low-adhesion cured film at its surface. The presence of the cured film makes it difficult for the adhesive to adhere surely to an adherend, particularly when an irradiation energy is excessively large or when the contact of the irradiated adhesive with an adherend is delayed. That is, the cationically photoreactive hot-melt adhesive does not show a substantial pot life before it is irradiated, but shows a relatively short pot life once it is irradiated.

In order to extend a pot life, a component called a cure retarder is generally incorporated in the cationically photoreactive adhesive. For example, although not a hot-melt adhesive, a liquid-form UV-curable resin composition is disclosed in Japanese Patent Laying-Open No. Sho 63-248825. This composition contains an epoxy resin, a UV-activated cationic catalyst and a compound having a polyalkylene oxide skeleton as a cure retarder. However, due to the absence of a hot-melt nature, this composition can not be coated into a thick film and its initial bond strength is low.

As described earlier, in Japanese Patent Laying-Open No. Hei 6-306346, a hot-melt composition is disclosed which contains a polyester resin that assumes a solid form at ordinary temperature, an epoxy resin, and a cationic photoinitiator. This reference describes a polyol component as being a preferred cure retarder.

However, such a cationic photoreactive adhesive cures substantially by a dark reaction. It accordingly takes a long time before curing thereof completes. In particular, the inclusion of a cure retarder slows down a rate of a cure reaction that proceeds by a dark reaction, while effective to extend a pot life. This creates a problem that the adhesive must be aged for a long time until its bond strength reaches a maximum.

Also, the adhesive while being cured does not exhibit high flexural strength. The adhesive does not develop sufficient flexural strength until it completes curing. This requires a long wait. Another problem arises where a cure retarder is incorporated in the adhesive. In such a case, complete curing thereof does not result in obtaining high flexural strength, while the reason is not clear.

DISCLOSURE OF THE INVENTION

In view of the current state of the above-described prior art, it is an object of the present invention to provide a photoreactive hot-melt adhesive composition which is readily applicable to an adherend by melt coating, completes curing soon after irradiation, reveals high adhesive strength immediately after lamination, does not require a long period of aging, and exhibits excellent durability after completion of curing.

It is another object of the present invention to provide a photoreactive adhesive composition which, after completion of curing, provides a cured product excellent in adhesion and heat resistance, particularly in resistance to hydrophilic liquid.

It is a further object of the present invention to provide a photoreactive adhesive composition which, after exposure to a radiation, insures a sufficiently long pot life and undergoes curing without delay, i.e., exhibits an excellent balance of potlife and curing time.

In accordance with a broad aspect of the present invention, a photoreactive hot-melt adhesive composition is provided which contains (a) a bisphenol F epoxy resin that assumes a solid form at ordinary temperature, (b) a compound having a polyoxyalkylene group in its main chain and any of a hydroxyl group, an epoxy group and an alkoxyl group containing 1–8 carbon atoms at its terminal, and (c) a cationic photoinitiator. While not particularly limiting, at least one selected from the group consisting of compounds represented by the following formula (1), a copolymer of tetramethylene oxide and ethylene oxide and a copolymer of tetramethylene oxide and propylene oxide may preferably be used as the compound (b), for example.

In accordance with another broad aspect of the present invention, a photoreactive hot-melt adhesive composition is provided which contains (a) a bisphenol F epoxy resin that assumes a solid form at ordinary temperature, (b) at least one compound selected from the group consisting of compounds represented by the following formula (1), a copolymer of tetramethylene oxide and ethylene oxide and a copolymer of tetramethylene oxide and propylene oxide, and (c) a cationic photoinitiator.

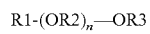
R1-(OR2)$_n$—OR3  Formula (1)

(in the formula, R1 and R3 independently represent any of a hydrogen atom, a glycidyl group and a monofunctional substituted or unsubstituted hydrocarbon group having 1–8 carbon atoms, R2 represents a bifunctional substituted or unsubstituted hydrocarbon group having 2–8 carbon atoms and n is an integer of 2 or larger. In (OR2)$_n$, R2's of OR2's may be all identical to or different from each other.)

Due to the inclusion of the bisphenol F epoxy resin as a curing component, the photoreactive hot-melt adhesive composition in accordance with the present invention can provide a cured product with improved durable adhesion.

In a particular aspect of the present invention, the compound represented by the formula (1) is used as the compound (b). This leads to proper reduction of a cure rate after irradiation, thereby insuring a sufficient pot life.

In particular, the use of polytetramethylene ether glycol or polyethylene glycol as the compound represented by the formula (1) is preferred. In such a case, a balance of pot life and cure time is further improved. That is, the properly extended pot life and shortened cure time result together.

Also in a particular aspect of the present invention, polyethylene glycol diglycidyl ether is used as the compound represented by the formula (1). That is, the compound represented by the formula (1) may be an epoxy compound having a glycidyl group at its terminal.

In another particular aspect of the present invention, a copolymer of tetramethylene oxide and ethylene oxide is used as the compound (b).

In still another particular aspect of the present invention, a copolymer of tetramethylene oxide and propylene oxide is used as the compound (b).

The compound (b) if comprising one of these copolymers insures excellent water resistance of a resulting cured product and a sufficient pot life.

In still another particular aspect of the present invention, a cationically polymerizable resin that assumes a liquid form at ordinary temperature is incorporated. The incorporation of such a cationically polymerizable resin that assumes a liquid form at ordinary temperature increases elasticity and flexibility of the photoreactive hot-melt adhesive composition after cure. Also, the incorporation of the liquid cationically polymerizable resin allows cationic polymerization to go proceed in a satisfactory fashion and increases a cure rate. The heat-resistant adhesion of a cured product is also increased.

Preferably, a bisphenol A epoxy resin, a hydrogenated bisphenol A epoxy resin, or a resin having alkylene oxide in its skeleton and represented by the following formula (2) is used as the cationically polymerizable resin that assumes a liquid form at ordinary temperature.

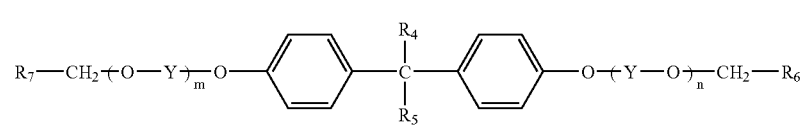

Formula (2)

(in the formula, $R_4$ and $R_5$ independently represent a hydrogen atom or a methyl group; $R_6$ and $R_7$ independently represent a cationically polymerizable, reactive group represented by the following formula (3); Y represents an alkylene group; and m and n independently represent 0 or a positive integer of 1 or larger.)

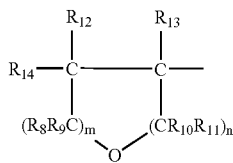

Formula (3)

(in the formula, $R_8$, $R_9$, $R_{10}$, and $R_{11}$ independently represent any of a hydrogen atom and methyl, ethyl, isopropyl, isoamyl and phenyl groups; $R_{12}$, $R_{13}$ and $R_{14}$ independently represent a hydrogen atom or an organic group; and m and n independently represent 0, 1 or 2.)

In still another particular aspect of the photoreactive hot-melt adhesive composition in accordance with the present invention, the compound represented by the formula (1) is not an epoxy compound and is incorporated in the amount of 5–40 parts by weight, based on 100 parts by weight of all epoxy resins.

In still another particular aspect of the photoreactive hot-melt adhesive composition in accordance with the present invention, the compound represented by the formula (1) is an epoxy compound and is incorporated in the amount of 5–40 parts by weight, based on 100 parts by weight of all epoxy resins excepting the compound represented by the formula (1).

In still another particular aspect of the photoreactive hot-melt adhesive composition in accordance with the present invention, the compound (b) is a copolymer of tetramethylene oxide and ethylene oxide or a copolymer of tetramethylene oxide and propylene oxide and is incorporated in the amount of 1–40 parts by weight, based on 100 parts by weight of all epoxy resins.

In still another particular aspect of the photoreactive hot-melt adhesive composition in accordance with the present invention, a polyester compound that assumes a solid form at ordinary temperature (23° C.) is not incorporated. That is, even without the solid polyester compound, a photoreactive hot-melt adhesive composition can be provided which accompanies speedy curing after irradiation and reveals sufficient durable adhesion in accordance with the present invention.

Details of the present invention are given below.

When the photoreactive hot-melt adhesive composition according to the present invention is exposed to radiation, the cationic photoinitiator is activated to thereby initiate ring-opening polymerization of the bisphenol F epoxy resin, so that curing of the composition is allowed to go proceed. After completion of curing, the composition thus reveals the improved bond strength. Also, the use of the bisphenol F epoxy resin and the compound represented by the formula (1), the copolymer of tetramethylene oxide and ethylene oxide or the copolymer of tetramethylene oxide and propylene oxide increases the resistance of the composition to heat and water or other hydrophilic liquids, which will be later described in detail. Furthermore, the use of the bisphenol F epoxy resin and either the copolymer of tetramethylene oxide and ethylene oxide or the copolymer of tetramethylene oxide and propylene oxide enables speedy curing of the adhesive while insuring a sufficiently extended pot life after irradiation, as will be described below in detail. Accordingly, a photoreactive hot-melt adhesive can be provided which attains a maximum bond strength within a short period of time and thus does not require long-term aging.

(a) Bisphenol F Epoxy Resin which Assumes a Solid Form at Ordinary Temperature (23° C.)

The bisphenol F epoxy resin undergoes ring-opening polymerization when the cationic photoinitiator is activated by irradiation and imparts excellent bond strength to the photoreactive hot-melt adhesive composition in accordance with the present invention. This is probably because the bisphenol F epoxy resin has a more flexible skeleton and thus provides a cured product which shows improved stress relaxation, compared to the bisphenol A epoxy resin, due to the presence of a hydrogen atom on a carbon atom to which the phenol group is attached. Also, the bisphenol F epoxy resin when reacted with the compound (b) acts to increase the resistance of the cured product to water and other hydrophilic liquids.

The type of the bisphenol F epoxy resin is not particularly specified. For example, bisphenol F epoxy resins having weight average molecular weights in the approximate range of 600–60,000 can be suitably used. Specific examples thereof include those sold under the names of EPICOAT 4004P and EPICOAT 4010P and manufactured by Yuka-Shell Epoxy Co., Ltd.

Compound (b)

In the present invention, a compound having a polyoxyalkylene group in its main chain and any of a hydroxyl group, an epoxy group and an alkoxyl group containing 1–8 carbon atoms at its terminal is used as the compound (b)

The compound (b) is not particularly limited in type, so long as it has the above-specified structure. However, the compound represented by the formula (1), the copolymer of tetramethylene oxide and ethylene oxide or the copolymer of tetramethylene oxide and propylene oxide is preferably used.

The compound represented by the formula (1) is not particularly specified in type, so long as it satisfies the formula (1), but may be illustrated by polytetramethylene ether glycol (PTMG), polyethylene glycol (PEG), polyethylene glycol diglycidyl ether and the like.

PTMG has a structure represented by H—(—O—CH$_2$CH$_2$CH$_2$CH$_2$—)$_n$—OH wherein n is a natural number of 2 or larger.

Although its molecular weight is not particularly specified, PTMG for use in the present invention preferably has a weight average molecular weight of 1,000 or higher for its ability to improve heat-resistant adhesion. PTMG having a weight average molecular weight of below 1,000 assumes a liquid form at ordinary temperature. In this invention, PTMG, either liquid or solid form at ordinary temperature, can be used.

Preferably, the amount of PTMG incorporated is within the range of 5–40 parts by weight, based on 100 parts by weight of the bisphenol F epoxy resin that assumes a solid form at ordinary temperature and the optionally-added epoxy resin that assumes a liquid form at ordinary temperature. If the amount of PTMG incorporated is below 5 parts by weight, its effect of increasing the resistance of a cured product to hydrophilic liquids may not be obtained in a sufficient manner. If it exceeds 40 parts by weight, curing may proceed at a very low rate.

Polyethylene glycol (PEG) has a structure represented by H—(—O—CH$_2$CH$_2$—)$_n$—OH wherein n is a natural number of 2 or larger.

Although its molecular weight is not particularly specified, PEG for use in the present invention preferably has a weight average molecular weight of 600 or higher for its ability to improve heat-resistant adhesion. PEG having a weight average molecular weight of below 600 assumes a liquid form at ordinary temperature. In the present invention, PEG, either liquid or solid form at ordinary temperature, can be used.

Preferably, the amount of PEG incorporated is within the range of 5–40 parts by weight, based on 100 parts by weight of the bisphenol F epoxy resin that assumes a solid form at ordinary temperature and the optionally-added epoxy resin that assumes a liquid form at ordinary temperature. If the amount of PEG incorporated is below 5 parts by weight, its effect of increasing the resistance of a cured product to hydrophilic liquids may not be obtained in a sufficient manner. If it exceeds 40 parts by weight, curing may proceed at a very low rate.

Although its molecular weight is not particularly specified, polyethylene glycol diglycidyl ether for use in the present invention preferably has a weight average molecular weight of 200 or higher for its ability to improve heat-resistant adhesion.

Preferably, the amount of polyethylene glycol diglycidyl ether incorporated is within the range of 5–40 parts by weight, based on 100 parts by weight of all epoxy resins excepting the polyethylene glycol diglycidyl ether. If the amount of polyethylene glycol diglycidyl ether incorporated is below 5 parts by weight, its effect of increasing the resistance of a cured product to hydrophilic liquids may not be obtained in a sufficient manner. If it exceeds 40 parts by weight, curing may proceed at a very low rate. Accordingly, it is not desirable to incorporate it in the amount which falls outside the specified range.

The copolymer of tetramethylene oxide and ethylene oxide for use in the present invention can be obtained, for example, by allowing tetramethylene oxide and ethylene oxide to undergo ring-opening polymerization. For example, such a copolymer can be produced by subjecting tetramethylene oxide and ethylene oxide to ring-opening copolymerization, under the presence of a ring-opening polymerization catalyst and a polyhydroxyl or polyphenol compound, such that the resulting oxyethylene chain falls generally within the range of 10–60% by weight. This ring-opening copolymerization may proceed in the form of either block or random addition polymerization. The copolymer of tetramethylene oxide and ethylene oxide is sold in the market, for example, under the trade designation UNISAFE DC1100 (product of NOF Corp.).

Examples of polyhydroxyl compounds include diols such as ethylene glycol, diethylene glycol, propylene glycol, dipropylene glycol, 1,4-butanediol, neopentyl glycol, 1,6-hexanediol and 1,8-octanediol; triols such as glycerin, trimethylolpropane and hexanetriol; and tetra- and higher-hydric alcohols such as sorbitol. Examples of polyphenols include hydroquinone, bisphenol A, bisphenol F and the like.

The copolymer of tetramethylene oxide and propylene oxide for use in the present invention can be obtained, for example, by allowing tetramethylene oxide and propylene oxide to undergo ring-opening polymerization. For example, this copolymer can be produced by subjecting tetramethylene oxide and propylene oxide to ring-opening copolymerization, under the presence of a ring-opening polymerization catalyst and a polyhydroxyl or polyphenol compound, such that the resulting oxypropylene chain falls generally within the range of 10–60% by weight. Ring-opening copolymerization may proceed in the form of either block or random addition polymerization. Also, the copolymer of tetramethylene oxide and propylene oxide is sold in the market, for example, under the trade designation UNISAFE DCB1000 (product of NOF Corporation).

The above-listed polyhydroxyl and polyphenol compounds for use in obtaining the copolymer of tetramethylene oxide and ethylene oxide can also be used to obtain the copolymer of tetramethylene oxide and propylene oxide.

The loading of the copolymer of tetramethylene oxide and ethylene oxide or the copolymer of tetramethylene oxide and propylene oxide is preferably 1–40 parts by weight, more preferably 5–40 parts by weight, based on 100 parts by weight of the aforementioned bisphenol F epoxy resin that assumes a solid form at ordinary temperature and optionally-added epoxy resin that assumes a liquid form at ordinary temperature, i.e., based on 100 parts by weight of all epoxy resins.

If the amount of the copolymer incorporated is below 1 part by weight, its effect of increasing the resistance of a cured product to hydrophilic liquids may not be obtained in a sufficient manner. If it exceeds 40 parts by weight, curing may proceed at a very low rate. If it is not below 5 parts by weight, the composition becomes more flexible and less breakable when it is formed into a sheet.

Although its molecular weight is not particularly specified, the copolymer of tetramethylene oxide and ethylene oxide or propylene oxide for use in the present invention preferably has a weight average molecular weight of 200–4,000. If its weight average molecular weight falls below 200, a flash point is lowered to possibly reduce the safety during hot-melt coating. If its weight average molecular weight goes beyond 4,000, its compatibility may be reduced.

(c) Cationic Photoinitiator

In the present invention, any cationic photoinitiator can be suitably used, so long as it is activated by exposure to radiation to cause ring-opening polymerization of the epoxy resin. Examples of cationic photoinitiators include sulfonium salts, iodonium salts and onium salts. Preferred among such cationic photoinitiators are sulfonium salts. Particularly preferred among sulfonium salts are aromatic sulfonium salts. For example, U.S. Pat. No. 4,256,828 discloses such aromatic sulfonium salts. Specific examples thereof include triphenylsulfonium salts, methyldiphenylsulfonium salts, dimethylphenylsulfonium salts, diphenylnaphthylsulfonium salts and di(methoxynaphthyl)methylsulfonium salts. Preferred among such aromatic sulfonium salts are aromatic sulfonium salts with hexafluorophosphate ions (PF$_6^-$) as counter ions, such as those disclosed in U.S. Pat. No. 4,256,828. Specific examples include triphenylsulfonium hexafluorophosphate, methyldiphenylsulfonium hexafluorophosphate, dimethylphenylsulfonium hexafluorophosphate, diphenylnaphthylsulfonium hexafluorophosphate and di(methoxynaphthyl)methylsulfonium hexafluorophosphate. Advantageously, the aromatic sulfonium salts having PF$_6^-$ as a counter ion exhibit excellent heat stability in the case where the adhesive while shielded against a radiation effective to initiate curing is caused to melt by heating (for example, after the cationic photoinitiator is added to a resin melted by heating during production of the adhesive or when the adhesive is caused to melt by heating before it is coated as a hot-melt adhesive). The "heat stability", as used herein, means that heating alone is insufficient or only slightly effective for the cationic photoinitiator to cause ring-opening polymerization of the epoxy resin. Such aromatic sulfonium salts having $PF_6^-$ as a counter ion are sold in the market, for example, under the product names SP-150 (product of Asahi Denka Kogyo Co., Ltd.) and CYRACURE UVI-6990 (product of Union Carbide Corp.).

The amount of the cationic photoinitiator incorporated may be varied depending upon the type and intensity of the radiation, the types and amounts of the epoxy resins, the type of the cationic photoinitiator used and the like. Preferably, the cationic photoinitiator is incorporated in the amount of 0.01–10 parts by weight, based on 100 parts by weight of the bisphenol F epoxy resin that assumes a solid form at ordinary temperature and the other epoxy resins. The other epoxy resins refer to the compounds represented by the formula (1), if in the form of epoxy compounds, and the optional epoxy resin that assumes a liquid form at ordinary temperature.

(d) Liquid-Form Cationically Polymerizable Resin

Besides the bisphenol F epoxy resin that assumes a solid form at ordinary temperature, the photoreactive hot-melt adhesive composition in accordance with the present invention may further contain a cationically polymerizable resin that assumes a liquid form at ordinary temperature. The type of the cationically polymerizable resin is not particularly specified, so long as it assumes a liquid form at ordinary temperature (23° C.). Examples of such resins include epoxy resins such as a bisphenol A epoxy resin, hydrogenated bisphenol A epoxy resin, bisphenol F epoxy resin, hydrogenated bisphenol F epoxy resin, phenol-novolac based epoxy resin and cresol-novolac based epoxy resin; 3-ethyl-3-hydroxymethyl oxetane; 1,4-bis{[(3-ethyl-3-oxytanyl)methoxy]methyl}benzene; and the like. Out of these resins, the bisphenol A epoxy resin is particularly useful for its ability to impart improved resistance against hydrophilic liquids to a bonded laminate.

The cationically polymerizable resin that assumes a liquid form at ordinary temperature acts to improve the elasticity and flexibility of the photoreactive hot-melt adhesive composition after cure. Also, in the case where the bisphenol F epoxy resin that assumes a solid form at ordinary temperature, if present independently, fails to undergo cationic polymerization in a sufficient manner, the liquid-form cationically polymerizable resin, because of its highly cationically polymerizable nature, acts to allow cationic polymerization to proceed in a satisfactory manner, increase a cure rate and further enhance heat-resistant adhesion of a cured product.

The excess loading of the liquid-form cationically polymerizable resin reduces the resistance to hydrophilic liquids and in some cases causes interfacial separation of a bonded laminate if immersed into a hydrophilic liquid such as water. It is accordingly preferred that the amount of the liquid-form cationically polymerizable resin used be within the range of 1–40 parts by weight, based on 100 parts by weight of the bisphenol F epoxy resin that assumes a solid form at ordinary temperature.

More preferably, the aforementioned resin having an alkylene oxide skeleton and represented by the formula (2) is suitably used as the cationically polymerizable resin. The resin exhibits superior flexibility particularly when its alkylene oxide skeleton is a linear alkylene oxide. An ethylene oxide skeleton is particularly preferred.

When the resin represented by the formula (2) is used, the composition becomes more curable and develops improved durable adhesion.

Illustrative of the bisphenol A epoxy resin represented by such an formula (2) is a product manufactured by New Japan Chemical Co., Ltd. and available under the designation BEO 60E.

(e) Other Applicable Components

The photoreactive hot-melt adhesive composition in accordance with the present invention may further contain other components, if necessary, within the range that does not impede the purposes of the present invention. Examples of such components include adhesion improvers, sensitizers, dehydrating agents, antioxidants, stabilizers, plasticizers, waxes, fillers, flame retardants, blowing agents, antistatic agents, fungicides, viscosity control agents and the like. Applicable components are not limited to those listed above. Any combination of the above-listed components may be added.

Examples of adhesion improvers include those compounds which are liquid at ordinary temperature, e.g., polyester polyols, polyurethane polyols, and terminally epoxy- or alkoxy-modified polyerster polyols and polyurethane polyols. These adhesion improvers can provide a cure retarding effect. Specific examples of compounds for use as such adhesion improvers include NK OLIGO UA 340P (liquid polyurethane resin) manufactured by Shin-Nakamura Chemical Co., Ltd.; DESMOPHEN Series (available from Miles Inc.) of saturated polyester polyols, such as DESMOPHEN 2000, 2500, 2501, 2001KS, 2502, 2505, 1700, 1800 and 2504; RUCOFLEX Series (available from Ruco Corp.) of saturated polyester polyols, such as S-107, S-109, S-1011 and S-1014; VORANOL 234-630 (trimethylolpropane) from Dow Chemical Co.; and the like.

The polyester polyols, because of their liquid form, do not show hot-melt properties. Accordingly, no reduction in adhesion occurs even if they undergo hydrolysis.

(f) Method for Production of the Photoreactive Hot-Melt Adhesive Composition in Accordance with the Present Invention Any method which achieves mixing and uniform dispersion of the formulated components can be utilized to produce the photoreactive hot-melt adhesive composition in accordance with the present invention. However, those components must be mixed under such proper heating conditions that they can melt. In the production, mixing and dispersing of the components may be achieved either without a solvent or in an inert solvent. Also, mixing of the components is preferably achieved under a nonaqueous condition. This reduces inclusion of water which is a component inhibiting cationic polymerization.

Also, production of the photoreactive hot-melt adhesive composition in accordance with the present invention must be carried out under such conditions that a radiation effective to initiate curing is shielded.

(g) Joining Method and Use Application

When the photoreactive hot-melt adhesive composition in accordance with the present invention is utilized to join adherends to each other, it is first allowed to melt by heating. The photoreactive hot-melt adhesive composition while in a molten state is then coated on one or both of the adherends. The photoreactive hot-melt adhesive composition is exposed to a radiation, either before or after lamination of the adherends. Ring-opening polymerization of the epoxy resin proceeds speedily after irradiation. After the composition finally completes curing, it reveals bond strength. Since the cationic photopolymerizatlon proceeds by a dark reaction, curing continues even after irradiation is paused or terminated and finally completes.

The technique used to thermally melt the photoreactive hot-melt adhesive composition and coat it on the adherend is not particularly specified. Applicable techniques include, for example, use of a conventional hot-melt applicator or hot-melt coater, immersion of an adherend into a thermally melted photoreactive hot-melt adhesive composition, spraying a photoreactive hot-melt adhesive composition while in a hot molten state onto an adherend as by a hot-melt air gun, and extruding a thermally melted photoreactive hot-melt adhesive composition onto a surface of an adherend as by an extruding machine.

The type of the radiation used to cure the composition is not particularly specified if it can cause the cationic photo-initiator to generate cations, and can be suitably chosen depending on the type of the cationic photoinitiator used. The applicable radiation may be in the ultraviolet range or in the 200–600 nm wavelength range. Particularly in the case where the aromatic sulfonium salt is used as the cationic photoinitiator, the radiation preferably includes a wavelength of 200–400 nm.

The energy exposure can not be readily determined because it is varied depending on the type of the cationic photoinitiator used and the thickness and spread of the photoreactive hot-melt adhesive composition coated on an adherend, but may preferably be in the range of 0.001 J–10 J.

The exposure time can not be specified in a wholesale manner because it is varied depending on the intensity of the radiation, the type of the epoxy resin used and the like, but is generally sufficient if within the range of 0.1–30 seconds. When the adhesive is coated in a relatively thick manner, the exposure time may preferably be extended beyond the above-specified range.

A source of the radiation if in the ultraviolet region can be selected from those generally used as ultraviolet radiation sources, e.g., fluorescent lamps and high-pressure mercury lamps.

The photoreactive hot-melt adhesive composition in accordance with the present invention, when exposed to a radiation under ordinary conditions, cures in a sufficient manner to provide satisfactory bond strength. It is however preferred that heat be additionally applied within the range that does not cause deformation or deterioration of the adherends. This results in obtaining very high bond strength.

The type of the adherend to which the photoreactive hot-melt adhesive composition in accordance with the present invention is applied is not particularly limited. Plastic adherends can be suitably used, including those made from polyester resins such as polyethylene terephthalate, polycarbonate and polyallylate; acrylic resins; and the like.

The photoreactive hot-melt adhesive composition in accordance with the present invention can also be applied to adherends made from a wide range of materials including plastics other than polyethylene terephthalate; rubbers such as ethylene propylene rubber; metals such as iron and aluminum and alloys; cellulosic materials such as wood and paper; leathers; and the like.

BEST MODE FOR CARRYING OUT THE INVENTION

The present invention is below described in more detail by referring to specific examples of the present invention. It should be understood that the present invention is not limited to the following Examples.

I. EXAMPLES 1–21 AND COMPARATIVE EXAMPLES 1–12

Example 1

2 parts by weight of a liquid epoxy resin (bisphenol A epoxy resin, product of New Japan Chem. Co., Ltd., product name: BEO 60E), 15 parts by weight of a solid bisphenol F epoxy resin #1 (product of Yuka-Shell Epoxy Co., Ltd., product number: EPICOAT 4004P), 10 parts by weight of a solid bisphenol F epoxy resin #2 (product of Yuka-Shell Epoxy Co., Ltd., product number: EPICOAT 4010P), 4 parts by weight of PTMG (product of Mitsubishi Chemical Corp., product number PTMG 1000, weight average molecular weight of 1000) and 3 parts by weight of a cationic photoinitiator (product of Union Carbide Corp., product name: CYRACURE UVI-6990) were kneaded in a melt kneading machine to prepare a photoreactive hot-melt adhesive composition.

Example 2

The procedure of Example 1 was followed, except that the loading of PTMG was changed to 2 parts by weight, to prepare a photoreactive hot-melt adhesive composition.

Example 3

The procedure of Example 1 was followed, except that the respective loadings of bisphenol F epoxy resin (product of Yuka-Shell Epoxy Co., Ltd., product number: EPICOAT 4004P), bisphenol F epoxy resin (product of Yuka-Shell Epoxy Co., Ltd., product number: EPICOAT 4010P) and PTMG were changed to 10, 20 and 8 parts by weight, to obtain a photoreactive hot-melt adhesive composition.

Comparative Example 1

The procedure of Example 1 was followed, except that PTMG was replaced by 4 parts by weight of SPINODOL (name used in the trade and manufactured by Dainippon Ink and Chemicals, Inc., phthalate diester compound), to obtain a photoreactive hot-melt adhesive composition.

Example 4

5 parts by weight of a liquid, flexible epoxy resin (product of New Japan Chemical Co., Ltd., product number: BEO 60E), 48 parts by weight of bisphenol F epoxy resin #1 (bisphenol F epoxy resin, product of Yuka-Shell Epoxy Co., Ltd., product number: EPICOAT 4004P, molecular weight=about 1,800), 32 parts by weight of bisphenol F epoxy resin #2 (bisphenol F epoxy resin, product of Yuka-Shell Epoxy Co., Ltd., product number: EPICOAT 4010P, molecular weight=about 9,000), 13 parts by weight of PTMG (product of Mitsubishi Chemical Corp., weight average molecular weight=about 650) and 3 parts by weight of cationic photoinitiator (product of Union Carbide Corp., product name: CYRACURE UVI-6990) were mixed in the same manner as in Example 1 to obtain a photoreactive hot-melt adhesive composition.

Example 5

2 parts by weight of a liquid, flexible epoxy resin (product of New Japan Chemical Co., Ltd., product number: BEO 60E), 15 parts by weight of bisphenol F epoxy resin #1

(bisphenol F epoxy resin, product of Yuka-Shell Epoxy Co., Ltd., product number: EPICOAT 4004P, molecular weight=about 1,800), 10 parts by weight of bisphenol F epoxy resin #2 (bisphenol F epoxy resin, product of Yuka-Shell Epoxy Co., Ltd., product number: EPICOAT 4010P, molecular weight=about 9,000), 4 parts by weight of polyethylene glycol (weight average molecular weight=650, liquid at ordinary temperature) and 3 parts by weight of cationic photo-initiator (product of Union Carbide Corp., product name: CYRACURE UVI-6990) were mixed in the same manner as in Example 1 to obtain a photoreactive hot-melt adhesive composition.

Example 6

The procedure of Example 5 was followed, except that polyethylene glycol having a weight average molecular weight of 1,500 was used, to obtain a photoreactive hot-melt adhesive composition.

Example 7

2 parts by weight of a liquid epoxy resin (product of New Japan Chemical Co., Ltd., product name: BEO 60E), 15 parts by weight of bisphenol F epoxy resin #1 (product of Yuka-Shell Epoxy Co., Ltd., product number: EPICOAT 4004P), 10 parts by weight of bisphenol F epoxy resin #2 (product of Yuka-Shell Epoxy Co., Ltd., product number: EPICOAT 4010P), 4 parts by weight of PTMG (product of Mitsubishi Chemical Corp., product number: PTMG 1000, weight average molecular weight=1,000) and 0.8 parts by weight of cationic photoinitiator (product of Union Carbide Corp., product name: CYRACURE UVI-6990) were kneaded in a kneading machine to prepare a photoreactive hot-melt adhesive composition.

Example 8

The procedure of Example 7 was followed, except that the loading of PTMG was changed to 2 parts by weight, to prepare a photoreactive hot-melt adhesive composition.

Example 9

The procedure of Example 7 was followed, except that the loading of PTMG was changed to 8 parts by weight, to obtain a photoreactive hot-melt adhesive composition.

Comparative Example 2

The procedure of Example 7 was followed, except that PTMG was replaced by 4 parts by weight of SPINODOL (name used in the trade and manufactured by Dainippon Ink and Chemicals, Inc., phthalate diester compound), to obtain a photoreactive hot-melt adhesive composition.

Example 10

5 parts by weight of a liquid, flexible epoxy resin (product of New Japan Chemical Co., Ltd., product number: BEO 60E), 48 parts by weight of bisphenol F epoxy resin #1 (bisphenol F epoxy resin, product of Yuka-Shell Epoxy Co., Ltd., product number: EPICOAT 4004P, molecular weight=about 1,800), 32 parts by weight of bisphenol F epoxy resin #2 (bisphenol F epoxy resin, product of Yuka-Shell Epoxy Co., Ltd., product number: EPICOAT 4010P, molecular weight=about 9,000), 13 parts by weight of PTMG (product of Mitsubishi Chemical Corp., weight average molecular weight=650) and 0.8 parts by weight of a cationic photoinitiator (product of Union Carbide Corp., product name: CYRACURE UVI-6990) were mixed in the same manner as in Example 1 to obtain a photoreactive hot-melt adhesive composition.

Example 11

2 parts by weight of a liquid, flexible epoxy resin (product of New Japan Chemical Co., Ltd., product number: BEO 60E), 15 parts by weight of bisphenol F epoxy resin #1 (bisphenol F epoxy resin, product of Yuka-Shell Epoxy Co., Ltd., product number: EPICOAT 4004P, molecular weight=about 1,800), 10 parts by weight of bisphenol F epoxy resin #2 (bisphenol F epoxy resin, product of Yuka-Shell Epoxy Co., Ltd., product number: EPICOAT 4010P, molecular weight=about 9,000), 4 parts by weight of polyethylene glycol (weight average molecular weight=1500) and 0.8 parts by weight of cationic photo-initiator (product of Union Carbide Corp., product name: CYRACURE UVI-6990) were mixed in the same manner as in Example 1 to obtain a photoreactive hot-melt adhesive composition.

Example 12

The procedure of Example 11 was followed, except that polyethylene glycol having a weight average molecular weight of 650 was used, to obtain a photoreactive hot-melt adhesive composition.

Example 13

The procedure of Example 11 was followed, except that liquid-form polyethylene glycol having a weight average molecular weight of 600 and a freezing point of 20.3° C. was used, to obtain a photoreactive hot-melt adhesive composition.

Example 14

The procedure of Example 7 was followed, except that PTMG was replaced by 2 parts by weight of polyethylene glycol diglycidyl ether (product of Nagase Chem. Industries, Ltd., product name: DENACOL EX-832, weight average molecular weight=560, liquid at 23° C.) as a glycidyl compound, to obtain a photoreactive hot-melt adhesive composition.

Example 15

The procedure of Example 14 was followed, except that the loading of polyethylene glycol glycidyl ether was changed to 3 parts by weight, to obtain a photoreactive hot-melt adhesive composition.

Example 16

The procedure of Example 14 was followed, except that the loading of polyethylene glycol glycidyl ether was changed to 6 parts by weight, to obtain a photoreactive hot-melt adhesive composition.

Comparative Example 3

The procedure of Example 7 was followed, except that the bisphenol F epoxy resins #1 and #2 were replaced by 15 parts by weight of bisphenol A epoxy resin #1 (product of Yuka-Shell Epoxy Co., Ltd., product name: EPICOAT 1001, weight average molecular weight=900) and 10 parts by weight of bisphenol A epoxy resin #2 (product of Yuka-Shell Epoxy Co., Ltd., product name: EPICOAT 1010, weight average molecular weight=5,500) as shown in the below-given Table 1, to obtain a photoreactive hot-melt adhesive composition.

Comparative Example 4

The procedure of Example 10 was followed, except that the bisphenol F epoxy resins #1 and #2 were replaced by 48 and 32 parts by weight of the bisphenol A epoxy resins #1 and #2 used in Comparative Example 3, as shown in the below-given Table 1, to obtain a photoreactive hot-melt adhesive composition.

Comparative Example 5

The procedure of Example 12 was followed, except that the bisphenol F epoxy resins #1 and #2 were replaced by 15 parts by weight of the bisphenol A epoxy resin #1 and 10 parts by weight of the bisphenol A epoxy resin #2, to obtain a photoreactive hot-melt adhesive composition.

Comparative Example 6

The procedure of Example 13 was followed, except that the bisphenol F epoxy resins #1 and #2 were replaced by 15 parts by weight of the bisphenol A epoxy resin #1 and 10 parts by weight of the bisphenol A epoxy resin #2, to obtain a photoreactive hot-melt adhesive composition.

Comparative Example 7

The procedure of Example 15 was followed, except that the bisphenol F epoxy resins #1 and #2 were replaced by 15 parts by weight of the bisphenol A epoxy resin #1 and 10 parts by weight of the bisphenol A epoxy resin #2, to obtain a photoreactive hot-melt adhesive composition.

Example 17

10 parts by weight of a bisphenol F epoxy resin #1 (bisphenol F epoxy resin, product of Yuka-Shell Epoxy Co., Ltd., product number: EPICOAT 4004P, molecular weight=about 1,800), 20 parts by weight of a bisphenol F epoxy resin #2 (bisphenol F epoxy resin, product of Yuka-Shell Epoxy Co., Ltd., product number: EPICOAT 4010P, molecular weight=about 9,000), 10 parts by weight of PTMG (product of Mitsubishi Chemical Corp., weight average molecular weight=650) and 0.8 parts by weight of a cationic photoinitiator (product of Union Carbide Corp., product name: CYRACURE UVI-6990) were mixed in the same manner as in Example 1 to obtain a photoreactive hot-melt adhesive composition.

Example 18

The procedure of Example 17 was followed, except that PTMG was replaced by 10 parts by weight of polyethylene glycol (weight average molecular weight=600), to obtain a photoreactive hot-melt adhesive composition.

Example 19

The procedure of Example 17 was followed, except that PTMG was replaced by 6 parts by weight of polyethylene glycol diglycidyl ether (product of Nagase Chem. Industries, Ltd., product name: DENACOL EX-832, weight average molecular weight=560, liquid at 23° C.) as a glycidyl compound, to obtain a photoreactive hot-melt adhesive composition.

Comparative Example 8

The procedure of Example 17 was followed, except that the bisphenol F epoxy resins #1 and #2 were replaced by 10 parts by weight of bisphenol A epoxy resin #1 (product of Yuka-Shell Epoxy Co., Ltd., product name: EPICOAT 1001, weight average molecular weight=900) and 20 parts by weight of bisphenol A epoxy resin #2 (product of Yuka-Shell Epoxy Co., Ltd., product name: EPICOAT 1010, weight average molecular weight=5,500) as shown in the below-given Table 1, to obtain a photoreactive hot-melt adhesive composition.

Comparative Example 9

The procedure of Example 18 was followed, except that the bisphenol F epoxy resins #1 and #2 were replaced by 10 parts by weight of bisphenol A epoxy resin #1 (product of Yuka-Shell Epoxy Co., Ltd., product name: EPICOAT 1001, weight average molecular weight=900) and 20 parts by weight of bisphenol A epoxy resin #2 (product of Yuka-Shell Epoxy Co., Ltd., product name: EPICOAT 1010, weight average molecular weight=5,500) as shown in the below-given Table 1, to obtain a photoreactive hot-melt adhesive composition.

Comparative Example 10

The procedure of Example 19 was followed, except that the bisphenol F epoxy resins #1 and #2 were replaced by 10 parts by weight of bisphenol A epoxy resin #1 (product of Yuka-Shell Epoxy Co., Ltd., product name: EPICOAT-1001, weight average molecular weight=900) and 20 parts by weight of bisphenol A epoxy resin #2 (product of Yuka-Shell Epoxy Co., Ltd., product name: EPICOAT 1010, weight average molecular weight=5,500) as shown in the below-given Table 1, to obtain a photoreactive hot-melt adhesive composition.

EVALUATION OF EXAMPLES AND COMPARATIVE EXAMPLES

The respective formulations of the above-obtained photoreactive hot-melt adhesive compositions are listed in Table 1. Also, the following procedures were utilized to evaluate (1) dry adhesion, (2) water resistance and (3) heat-resistant adhesion. The results are given in Table 2.

(1) Dry adhesion: Two PET sheets (white polyethylene terephthalate sheet, product of Toray Industries, Inc., product name: LUMIRROR E20) each measuring a width of 1 cm and a thickness of 125 μm were provided as adherends. Under the 23° C. and 50% RH atmosphere, each photoreactive hot-melt adhesive composition was melt coated to provide a 300 g/m² spread on a surface of one PET sheet and exposed to a 365 nm radiation at an intensity of 50 mW/cm² using an ultra high-pressure mercury lamp for 30 seconds.

The coated PET sheet was brought into contact with the other PET sheet and then these PET sheets were heat pressed at 75° C. and 10 kg/cm² for 30 seconds to provide a bonded laminate which was subsequently aged for 48 hours. This bonded laminate was subjected to a 180 degree peel test at a pulling rate of 300 mm/min under the 23° C. and 50% RH atmosphere. Observation was then made to see how the peel test resulted, i.e., to see the occurrence of separation along an adhesive interface or adherend failure (i.e., failure of the PET sheets).

(2) Chemical resistance of bonded laminates: The bonded laminates obtained in the dry adhesion evaluation were aged in a constant temperature chamber at 23° C. for 48 hours and thereafter immersed in various types of aqueous solutions for predetermined periods of time in accordance with the conditions a–i, k and l specified in the below-given Table 3. After subsequent withdrawal, each bonded laminate was separated by application of a manual force that acted to pull the PET sheets apart. Observation was then made to see how the separation proceeded, i.e., to see the occurrence of separation along an adhesive interface or adherend failure (i.e., failure of the PET sheets).

(3) Gasoline resistance of bonded laminates: The bonded laminates obtained in the dry adhesion evaluation were aged in a constant temperature chamber at 23° C. for 48 hours and thereafter immersed in a solution for a predetermined period of time according to the condition j specified in the below-given Table 3. After subsequent withdrawal, each bonded laminate was separated by application of a manual force that acted to pull the PET sheets apart. Observation was then made to see how the separation proceeded, i.e., to see the occurrence of separation along an adhesive interface or adherend failure (i.e., failure of the PET sheets).

Among the bonded laminates which experienced adherend failure, those experienced complete adherend failure are reported in Table 2 as "adherend failure" and those partially experienced adherend failure and interfacial separation by an adherend failure rate as calculated from the following formula:

(Surface area of the PET sheet remaining at an adhesive interface/Surface area of the PTE sheet initially bonded)×100 (%)

(4) Heat resistance: Each bonded laminate obtained in the dry adhesion evaluation was subjected to a creep test, i.e., cut into a size with a 1 cm×1 cm adhesive area, placed in an oven and under a shear load of 300 g/cm² by a 300 g suspending weight, and heated at a rate of 0.6° C./min to 200° C. The temperature at which the weight fell was determined as a heat resistance temperature. If the weight did not fall even at 200° C., the heat resistance temperature was regarded as exceeding 200° C.

TABLE 1

|  | Photocatalyst | BEO | Bis A01P | Bis A10P | Bis F04P | Bis F10P | Spinodol | PTMG 1000 | PTMG 650 | PEG 1500 | PEG 650 | PEG 600 | Glycidyl 560 |
|---|---|---|---|---|---|---|---|---|---|---|---|---|---|
| Ex. 1 | 3 | 2 |  |  | 15 | 10 |  | 4 |  |  |  |  |  |
| Ex. 2 | 3 | 2 |  |  | 15 | 10 |  |  | 2 |  |  |  |  |
| Ex. 3 | 3 | 2 |  |  | 10 | 20 |  |  | 8 |  |  |  |  |
| Comp. Ex. 1 | 3 | 2 |  |  | 15 | 10 | 4 |  |  |  |  |  |  |
| Ex. 4 | 3 | 5 |  |  | 48 | 32 |  |  |  | 13 |  |  |  |
| Ex. 5 | 3 | 2 |  |  | 15 | 10 |  |  |  |  | 4 |  |  |
| Ex. 6 | 3 | 2 |  |  | 15 | 10 |  |  |  |  |  | 4 |  |
| Ex. 7 | 0.8 | 2 |  |  | 15 | 10 |  | 4 |  |  |  |  |  |
| Ex. 8 | 0.8 | 2 |  |  | 15 | 10 |  |  | 2 |  |  |  |  |
| Ex. 9 | 0.8 | 2 |  |  | 15 | 10 |  |  | 8 |  |  |  |  |
| Comp. Ex. 2 | 0.8 | 2 |  |  | 15 | 10 | 4 |  |  |  |  |  |  |
| Ex. 10 | 0.8 | 5 |  |  | 48 | 32 |  |  |  | 13 |  |  |  |
| Ex. 11 | 0.8 | 2 |  |  | 15 | 10 |  |  |  | 4 |  |  |  |
| Ex. 12 | 0.8 | 2 |  |  | 15 | 10 |  |  |  |  | 4 |  |  |
| Ex. 13 | 0.8 | 2 |  |  | 15 | 10 |  |  |  |  |  | 4 |  |
| Ex. 14 | 0.8 | 2 |  |  | 15 | 10 |  |  |  |  |  |  | 2 |
| Ex. 15 | 0.8 | 2 |  |  | 15 | 10 |  |  |  |  |  |  | 3 |
| Ex. 16 | 0.8 | 2 |  |  | 15 | 10 |  |  |  |  |  |  | 6 |
| Comp. Ex. 3 | 0.8 | 2 | 15 | 10 |  |  |  | 4 |  |  |  |  |  |
| Comp. Ex. 4 | 0.8 | 5 | 48 | 32 |  |  |  |  |  | 13 |  |  |  |
| Comp. Ex. 5 | 0.8 | 2 | 15 | 10 |  |  |  |  |  |  | 4 |  |  |
| Comp. Ex. 6 | 0.8 | 2 | 15 | 10 |  |  |  |  |  |  |  | 4 |  |
| Comp. Ex. 7 | 0.8 | 2 | 15 | 10 |  |  |  |  |  |  |  |  | 3 |
| Ex. 17 | 0.8 |  |  |  | 10 | 20 |  |  |  | 10 |  |  |  |
| Ex. 18 | 0.8 |  |  |  | 10 | 20 |  |  |  |  |  | 10 |  |
| Ex. 19 | 0.8 |  |  |  | 10 | 20 |  |  |  |  |  |  | 6 |
| Comp. Ex. 8 | 0.8 |  | 10 | 20 |  |  |  |  |  | 10 |  |  |  |
| Comp. Ex. 9 | 0.8 |  | 10 | 20 |  |  |  |  |  |  |  | 10 |  |
| Comp. Ex. 10 | 0.8 |  | 10 | 20 |  |  |  |  |  |  |  |  | 6 |

In Table 1, the abbreviations given indicate the following compounds.

BEO=liquid epoxy resin, product of New Japan Chemical Co., Ltd., product name: RIKARESIN BEO-60E BisA01P=bisphenol A epoxy resin #1 (product of Yuka-Shell Epoxy Co., Ltd., product name: EPICOAT 1001, molecular weight=900)

BisA10P=bisphenol A epoxy resin #2 (product of Yuka-Shell Epoxy Co., Ltd., product name: EPICOAT 1010, molecular weight=5,500)

BisF04P=bisphenol F epoxy resin #1 (product of Yuka-Shell Epoxy Co., Ltd., product name: EPICOAT 4004P, molecular weight=about 1,800)

BisF10P=bisphenol F epoxy resin #2 (product of Yuka-Shell Epoxy Co., Ltd., product name: EPICOAT 4010P, molecular weight=about 9,000)

Also, the numbers written under PTMG, PEG and glycidyl compound indicate molecular weights thereof.

TABLE 2

|  | Dry Adhesion | Chemical Resistance | Gasoline Resistance | Heat Resistance |
|---|---|---|---|---|
| Ex. 1 | Adherend Failure | Adherend Failure | Adherend Failure | >200° C. |
| Ex. 2 | Adherend Failure | Adherend Failure | Adherend Failure | >200° C. |
| Ex. 3 | Adherend Failure | Adherend Failure | Adherend Failure | >200° C. |
| Comp. Ex. 1 | Adherend Failure | Interface | Adherend Failure | >200° C. |
| Ex. 4 | Adherend Failure | Adherend Failure | Adherend Failure | >200° C. |
| Ex. 5 | Adherend Failure | Adherend Failure | Adherend Failure | >200° C. |
| Ex. 6 | Adherend Failure | Adherend Failure | Adherend Failure | >200° C. |
| Ex. 7 | Adherend Failure | Adherend Failure | Adherend Failure | >200° C. |
| Ex. 8 | Adherend Failure | Adherend Failure | Adherend Failure | >200° C. |
| Ex. 9 | Adherend Failure | Adherend Failure | Adherend Failure | >200° C. |
| Comp. Ex. 2 | Adherend Failure | Interface | Adherend Failure | >200° C. |
| Ex. 10 | Adherend Failure | Adherend Failure | Adherend Failure | >200° C. |
| Ex. 11 | Adherend Failure | Adherend Failure | Adherend Failure | >200° C. |
| Ex. 12 | Adherend Failure | Adherend Failure | Adherend Failure | >200° C. |
| Ex. 13 | Adherend Failure | Adherend Failure | Adherend Failure | >200° C. |
| Ex. 14 | Adherend Failure | Adherend Failure | Adherend Failure | >200° C. |
| Ex. 15 | Adherend Failure | Adherend Failure | Adherend Failure | >200° C. |
| Ex. 16 | Adherend Failure | Adherend Failure | Adherend Failure | >200° C. |
| Comp. Ex. 3 | Adherend Failure | Interface | Adherend Failure | >200° C. |
| Comp. Ex. 4 | Adherend Failure | Interface | Adherend Failure | >200° C. |
| Comp. Ex. 5 | Adherend Failure | Interface | Adherend Failure | >200° C. |
| Comp. Ex. 6 | Adherend Failure | Interface | Adherend Failure | >200° C. |
| Comp. Ex. 7 | Adherend Failure | Interface | Adherend Failure | >200° C. |
| Ex. 17 | Adherend Failure | Adherend Failure | 80% Adherend Failure | >200° C. |
| Ex. 18 | Adherend Failure | Adherend Failure | 90% Adherend Failure | >200° C. |
| Ex. 19 | Adherend Failure | Adherend Failure | 90% Adherend Failure | >200° C. |
| Comp. Ex. 8 | Adherend Failure | Interface | 90% Adherend Failure | >200° C. |
| Comp. Ex. 9 | Adherend Failure | Interface | 90% Adherend Failure | >200° C. |
| Comp. Ex. 10 | Adherend Failure | Interface | 90% Adherend Failure | >200° C. |

TABLE 3

| | |
|---|---|
| a | 1-Minute Immersion in Water |
| b | 1-Minute Immersion in Ethyl Alcohol |
| c | 1-Minute Immersion in Ethylene Glycol |
| d | 1-Minute Immersion in 5% Salt Water |
| e | 1-Minute Immersion in a 5% Aqueous Solution of Acetic Acid |
| f | 1-Minute Immersion in a 5% Aqueous Solution of Sodium Carbonate |
| g | 1-Minute Immersion in a 60% Aqueous Solution of Ethyl Alcohol |
| h | 1-Minute Immersion in 10% Sugar Water |
| i | 1-Minute Immersion in a 50% Aqueous Solution of Ethylene Glycol |
| j | 1-Minute Immersion in B Fluid (Gasoline) |
| k | 24-Hour Immersion in Artificial Sweat (Alkaline) |
| l | 24-Hour Immersion in Artificial Sweat (Acidic) |

As apparent from Table 2, the compositions obtained in Comparative Examples 1 and 2 both exhibit satisfactory dry adhesion, due to the inclusion of SPINODOL. However, the resulting bonded laminates show insufficient resistance against hydrophilic liquids.

Due to the replacement of the bisphenol F epoxy resin with the bisphenol A epoxy resin, the bonded laminates using the compositions of Comparative Examples 3–10 also exhibit insufficient resistance against hydrophilic liquids.

In contrast, the compositions of Examples 1–19 all exhibit superior dry adhesion. In addition, the resulting bonded laminates show excellent resistance to hydrophilic liquids and also to chemicals.

They also maintain satisfactory resistance against nonpolar liquids used as substituents of gasoline in the gasoline dip test, which are comparable in performance to those using the compositions of Comparative Examples.

Furthermore, the bonded laminates using the compositions of Examples 1–19 exhibit superior heat resistance.

Example 20

25 parts by weight of a bisphenol F epoxy resin (product of Yuka-Shell Epoxy Co., Ltd., product number: EPICOAT 4004P), 4 parts by weight of PTMG (product of Mitsubishi Chemical Corp., weight average molecular weight=1,000) and 2 parts by weight of a cationic photoinitiator (product of Union Carbide Corp., product name: CYRACURE UVI-6990 were kneaded in a melt kneading machine to prepare a photoreactive hot-melt adhesive composition.

Example 21

The procedure of Example 20 was followed, except that PTMG was replaced by 4 parts by weight of a copolymer of tetramethylene oxide and propylene oxide (product of NOF Corporation, product number: UNISAFE DCB 1000, 50 wt. % oxypropylene chain, weight average molecular weight=1,000), to prepare a photoreactive hot-melt adhesive composition.

Comparative Example 11

67.2 parts by weight of a bisphenol A diglycidyl ether epoxy resin (product of Shell Chemical Co., product number: EPON 1001F), 10 parts by weight of polyester (unsaturated straight-chain copolyester manufactured by Huels America, Inc., product number: DYNAPOL S1402), 22.8 parts by weight of a hydroxyl-containing material (product of Dow Chemical Co., addition product of glycerol polypropylene oxide, product number: VORANOL 230–238) and 1 part by weight of a photoinitiator (triphenylsulfonium hexafluoroantimonate photoinitiator prepared according to the method disclosed in U.S. Pat. No. 4,321,951) were kneaded in a melt kneading machine to obtain a photoreactive hot-melt adhesive composition.

Comparative Example 12

The procedure of Comparative Example 11 was followed, except that the respective loadings of the epoxy resin, polyester and hydroxyl-containing material were changed to 44.0, 40 and 15 parts by weight, to prepare a photoreactive hot-melt adhesive composition.

Comparative Example 13

74 parts by weight of a bisphenol A diglycidyl ether epoxy resin (product of Shell Chemical Co., product number: EPON 1001F), 25.0 parts by weight of a hydroxyl-containing material (product of Dow Chemical Co., addition product of glycerol polypropylene oxide, product number: VORANOL 230–238) and 1 part by weight of a photoinitiator (triphenyl-sulfonium hexafluoroantimonate photoinitiator prepared according to the method disclosed in U.S. Pat. No. 4,321,951) were kneaded in a melt kneading machine to obtain a photoreactive hot-melt adhesive composition.

EVALUATION OF EXAMPLES 20 AND 21 AND COMPARATIVE EXAMPLES 11–13

The photoreactive hot-melt adhesive compositions obtained in Examples 20 and 21 and Comparative Examples 11–13 were evaluated for (1) dry adhesion, (2) chemical resistance, (3) gasoline resistance and (4) heat resistance according to the procedures as applied to the composition of Example 1. In every case, the aging time was changed to 144 hours. The results are given in the following Table 4.

TABLE 4

|  | Dry Adhesion | Chemical Resistance | Gasoline Resistance | Heat Resistance |
|---|---|---|---|---|
| Ex. 20 | Adherend Failure | o | o | >200° C. |
| Ex. 21 | Adherend Failure | o | o | >200° C. |
| Comp. Ex. 11 | x | x | x | 99° C. |
| Comp. Ex. 12 | Adherend Failure | x | o | 91° C. |
| Comp. Ex. 13 | x | x | x | 85° C. | x indicates that interfacial separation occurred and o indicates that no interfacial separation occurred in the separation test.

II. EXAMPLES 2-1–3-2 AND COMPARATIVE EXAMPLES 2-1–3-2

The following Comparative Examples 2-1–3-2 are given to show the superior effects of Examples 2-1–3-2 using the copolymer of tetramethylene oxide and ethylene oxide or propylene oxide. These Comparative Examples 2-1–3-2 are adhesives using the compound represented by the formula (1) as the compound (b) and thus also exemplify the present invention.

Example 2-1

16.5 parts by weight of a bisphenol F epoxy resin that assumes a solid form at ordinary temperature (product of Yuka-Shell Epoxy Co., product number: EPICOAT 4004P), 10 parts by weight of a bisphenol F epoxy resin that assumes a solid form at ordinary temperature (product of Yuka-Shell Epoxy Co., product number: EPICOAT 4010P), 4.5 parts by weight of a copolymer of tetramethylene oxide and ethylene oxide (product of NOF Corp., product number: UNISAFE DC1100, 50 wt. % oxyethylene chain, weight average molecular weight=1,100), and 1 part by weight of a cationic photoinitiator (product of Union Carbide Corp., product name: CYRACURE UVI-6990 were kneaded in a melt kneading machine to prepare a photoreactive hot-melt adhesive composition.

Example 2-2

The procedure of Example 2-1 was followed, except that the copolymer of tetramethylene oxide and ethylene oxide was changed to the product number UNISAFE DC1800 (product of NOF Corp., 50 wt. % oxyethylene chain, weight average molecular weight=1,800), to prepare a photoreactive hot-melt adhesive composition.

Example 2-3

The procedure of Example 2-1 was followed, except that the copolymer of tetramethylene oxide and ethylene oxide was changed to the product number TETRAXYNOL AS200 (product of Sanyo Chem. Industries, Ltd., 30 wt. % oxyethylene chain, weight average molecular weight=2,000), to prepare a photoreactive hot-melt adhesive composition.

Example 2-4

1.5 parts by weight of a liquid, flexible epoxy resin (product of New Japan Chemical Co., Ltd., product number: BEO 60E), 15 parts by weight of a bisphenol F epoxy resin that assumes a solid form at ordinary temperature (product of Yuka-Shell Epoxy Co., product number: EPICOAT 4004P, molecular weight=about 1,800), 10 parts by weight of a bisphenol F epoxy resin that assumes a solid form at ordinary temperature (product of Yuka-Shell Epoxy Co., product number: EPICOAT 4010P, molecular weight=about 9,000), 4.5 parts by weight of a copolymer of tetramethylene oxide and ethylene oxide (product of NOF Corp., product number: UNISAFE DC1100, 50 wt. % oxyethylene chain, weight average molecular weight=1,100), and 1 part by weight of a cationic photoinitiator (product of Union Carbide Corp., product name: CYRACURE UVI-6990) were kneaded in a melt kneading machine to prepare a photoreactive hot-melt adhesive composition.

Example 2-5

The procedure of Example 2-4 was followed, except that the copolymer of tetramethylene oxide and ethylene oxide was changed to the product number UNISAFE DC1800 (product of NOF Corp., 50 wt. % oxyethylene chain, weight average molecular weight=1,800), to prepare a photoreactive hot-melt adhesive composition.

Example 2-6

The procedure of Example 2-4 was followed, except that the copolymer of tetramethylene oxide and ethylene oxide was changed to the product number TETRAXYNOL AS200 (product of Sanyo Chem. Industries, Ltd., 30 wt. % oxyethylene chain, weight average molecular weight=2,000), to prepare a photoreactive hot-melt adhesive composition.

Comparative Example 2-1

The procedure of Example 2-1 was followed, except that the copolymer of tetramethylene oxide and ethylene oxide was replaced by polytetramethylene ether glycol (product of Mitsubishi Chemical Corp., product number: PTMG 1000, weight average molecular weight=1,000), to prepare a photoreactive hot-melt adhesive composition.

Comparative Example 2-2

The procedure of Example 2-1 was followed, except that the copolymer of tetramethylene oxide and ethylene oxide was replaced by polytetramethylene ether glycol (product of Mitsubishi Chemical Corp., product number: PTMG 2000, weight average molecular weight=2,000), to prepare a photoreactive hot-melt adhesive composition.

Comparative Example 2-3

The procedure of Example 2-4 was followed, except that the copolymer of tetramethylene oxide and ethylene oxide was replaced by polytetramethylene ether glycol (product of Mitsubishi Chemical Corp., product number: PTMG 1000, weight average molecular weight=1,000), to prepare a photoreactive hot-melt adhesive composition.

Comparative Example 2-4

The procedure of Example 2-4 was followed, except that the copolymer of tetramethylene oxide and ethylene oxide was replaced by polytetramethylene ether glycol (product of Mitsubishi Chemical Corp., product number: PTMG 2000, weight average molecular weight=2,000), to prepare a photoreactive hot-melt adhesive composition.

EVALUATION OF EXAMPLES AND COMPARATIVE EXAMPLES

The formulations of such-obtained photoreactive hot-melt adhesive compositions are listed in Table 5. Also, the following procedures were utilized to evaluate (1) dry adhesion, (2) water resistance, (3) heat resistance and (4) gel fraction. The results are given in Table 6.

(1) Dry adhesion: The evaluation procedure of Example 1 was followed, except that the aging time was changed to 96 hours.

(2) Water resistance evaluation of bonded laminates: The bonded laminates were obtained in a similar manner to a method used to fabricate bonded laminates for dry adhesion evaluation, aged in a constant temperature chamber at 23° C. for 96 hours and then immersed in water for a predetermined period of time. After subsequent withdrawal, each bonded laminate was separated by application of a manual force that acted to pull the PET sheets apart. Observation was then made to see how the separation proceeded, i.e., to see the occurrence of separation along an adhesive interface or adherend failure.

Among the bonded laminates which experienced adherend failure, those experienced complete adherend failure are reported in Table 6 as "adherend failure" and those partially experienced adherend failure and interfacial separation are reported in Table 6 by an adherend failure rate calculated from the following formula 4.

$$\text{Adherend failure rate (\%)=(Surface area of the PET sheet remaining at an adhesive interface/Surface area or the PTE sheet initially bonded)} \times 100 \quad \text{[Formula 4]}$$

(3) Heat resistance: The heat resistance evaluation procedure of Example 1 was followed.

(4) Gel fraction: A portion of the adhesive that overflowed from the PET sheets as adherends in (1) dry adhesion evaluation was introduced into a glass bottle to an exact weight of 0.4 g. After addition of 30 g of methyl ethyl ketone (hereinafter abbreviated as MEK), the glass bottle was closed with a lid and then shaken mechanically at ordinary temperature for 24 hours. Thereafter, the bottle content was filtered through a 200 mesh screen to remove MEK-insoluble matter which was further dried at 120° C. for 2 hours to volatilize MEK completely. Then, a gel fraction was calculated from the following formula 5.

$$\text{Gel fraction (\%)=Weight of the MEK-insoluble matter subsequent to drying } (g)/0.4 \ g \times 100 \quad \text{[Formula 5]}$$

For each sample, the preceding gel fraction measurement test was carried out three times. A mean value of the three measurements is given in Table 6.

The composition having a higher mean value is regarded as being in a more advanced stage of a crosslinking reaction and more resistant to solvent attack (i.e., less soluble in solvents).

The bonded laminates placed under short-term aging conditions, instead of normal long-term aging conditions, were subjected to the above-described four types of tests. That is, the aging conditions were changed from the normal aging conditions where bonded laminates obtained via 30-second heat pressing under 100 N/cm² at 75° C. were left to stand at 23° C. for 96 hours to the short-term aging conditions where bonded laminates obtained via 10-minute heat pressing under 100 N/cm² at 75° C. were left to stand at 23° C. for 5 minutes, and the resulting samples were subjected to the aforementioned four types of tests. The test results for the samples made using the short-term aging conditions, together with the test results for the samples made using the normal aging conditions, are given in Table 6.

TABLE 5

| | UVI-6990 | BEO60E | EP 4004P | EP 4010P | DC1100 | DC1800 | AS200 | PTMG 1000 | PTMG 2000 |
|---|---|---|---|---|---|---|---|---|---|
| Ex. 2-1 | 1 | | 16.5 | 10 | 4.5 | | | | |
| Ex. 2-2 | 1 | | 16.5 | 10 | | 4.5 | | | |
| Ex. 2-3 | 1 | | 16.5 | 10 | | | 4.5 | | |
| Ex. 2-4 | 1 | 1.5 | 15 | 10 | 4.5 | | | | |
| Ex. 2-5 | 1 | 1.5 | 15 | 10 | | 4.5 | | | |
| Ex. 2-6 | 1 | 1.5 | 15 | 10 | | | 4.5 | | |
| Comp. Ex. 2-1 | 1 | | 16.5 | 10 | | | | 4.5 | |
| Comp. Ex. 2-2 | 1 | | 16.5 | 10 | | | | | 4.5 |
| Comp. Ex. 2-3 | 1 | 1.5 | 15 | 10 | | | | 4.5 | |
| Comp. Ex. 2-4 | 1 | 1.5 | 15 | 10 | | | | | 4.5 |

TABLE 6

| | Normal Aging Condition (75° C., 100 N/cm², 30 Sec.→ 23° C., 96 Hours Left) | | | | Accelerated Aging Condition (75° C., 100 N/cm², 10 Min.→ 23° C., 5 Min.Left) | | | |
|---|---|---|---|---|---|---|---|---|
| | Dry Adhesion | Water Resistance | Heat Resistance | Gel Fraction (%) | Dry Adhesion | Water Resistance | Heat Resistance | Gel Fraction (%) |
| Ex. 2-1 | Adherend Failure | Adherend Failure | >200° C. | 85 | Adherend Failure | Adherend Failure | >200° C. | 85 |
| EX. 2-2 | Adherend Failure | Adherend Failure | >200° C. | 84 | Adherend Failure | Adherend Failure | >200° C. | 84 |
| Ex. 2-3 | Adherend Failure | Adherend Failure | >200° C. | 82 | Adherend Failure | Adherend Failure | >200° C. | 82 |
| EX. 2-4 | Adherend Failure | Adherend Failure | >200° C. | 88 | Adherend Failure | Adherend Failure | >200° C. | 88 |
| Ex. 2-5 | Adherend Failure | Adherend Failure | >200° C. | 87 | Adherend Failure | Adherend Failure | >200° C. | 87 |
| EX. 2-6 | Adherend Failure | Adherend Failure | >200° C. | 85 | Adherend Failure | Adherend Failure | >200° C. | 85 |
| Comp. Ex. 2-1 | Adherend Failure | Adherend Failure | >200° C. | 73 | Cohesion | Interface | 85° C. | 48 |
| Comp. Ex. 2-2 | Adherend Failure | Adherend Failure | >200° C. | 78 | Cohesion | Interface | 85° C. | 49 |
| Comp. Ex. 2-3 | Adherend Failure | Adherend Failure | >200° C. | 77 | Cohesion | Interface | 87° C. | 52 |
| Comp. Ex. 2-4 | Adherend Failure | Adherend Failure | >200° C. | 81 | Cohesion | Interface | 89° C. | 55 |

As can be clearly seen from Table 6, the compositions of Comparative Examples 2-1, 2-2, 2-3 and 2-4 incorporating polytetramethylene ether glycol, instead of the copolymer of tetramethylene oxide and ethylene oxide, exhibit good performances when placed under the normal aging conditions but exhibit insufficient performances when placed under the accelerated aging conditions.

On the other hand, the compositions of Examples 2-1–2-6 exhibit satisfactory performances even if placed under either aging conditions.

Example 3-1

16.5 parts by weight of a bisphenol F epoxy resin that assumes a solid form at ordinary temperature (product of Yuka-Shell Epoxy Co., product number: EPICOAT 4004P), 10 parts by weight of a bisphenol F epoxy resin that assumes a solid form at ordinary temperature (product of Yuka-Shell Epoxy Co., product number: EPICOAT 4010P), 4.5 parts by weight of a copolymer of tetramethylene oxide and propylene oxide (product of NOF Corp., product number: UNISAFE DCB-1000, 50 wt. % oxypropylene chain, weight average molecular weight=1,000), and 1 part by weight of a cationic photoinitiator (product of Union Carbide Corp., product name: CYRACURE UVI-6990) were mixed in a melt kneading machine to prepare a photoreactive hot-melt adhesive composition.

Example 3-2

The procedure of Example 3-1 was followed, except that 1.5 parts by weight of an epoxy resin that assumes a liquid form at ordinary temperature (product of New Japan Chemical Co., Ltd., product number: BEO 60E) was further mixed, to obtain a photoreactive hot-melt adhesive composition.

Comparative Example 3-1

The procedure of Example 3-1 was followed, except that the copolymer of tetramethylene oxide and propylene oxide was replaced by polytetraethylene ether glycol (product of Mitsubishi Chemical Corp., product number: PTMG 1000, weight average molecular weight=1,000), to obtain a photoreactive hot-melt adhesive composition.

Comparative Example 3-2

The procedure of Example 3-2 was followed, except that the copolymer of tetramethylene oxide and propylene oxide was replaced by polytetramethylene ether glycol (product of Mitsubishi Chemical Corp., product number: PTMG 1000, weight average molecular weight=1,000), to obtain a photoreactive hot-melt adhesive composition.

EVALUATION OF EXAMPLES AND COMPARATIVE EXAMPLES

The formulations of such-obtained photoreactive hot-melt adhesive compositions are listed in Table 7. Also, the following procedures were utilized to evaluate (1) dry adhesion, (2) water resistance, (3) heat resistance and (4) flexural strength. The results are given in Table 8.

(1) Dry adhesion: The evaluation procedure of Example 1 was followed, except that the aging time was changed to 96 hours.

(2) Water resistance evaluation of bonded laminates: The evaluation procedure of Example 2-1 was followed. Among the bonded laminates which experienced adherend failure, those experienced complete adherend failure are reported in Table 8 as "adherend failure" and those partially experienced adherend failure and interfacial separation are reported by an adherend failure rate as calculated from the following formula.

Adherend failure rate (%) (Surface area of the PET sheet remaining at an adhesive interface/Surface area of the PTE sheet initially bonded)×100

(3) Heat resistance: The heat resistance evaluation procedure of Example 1 was followed, except that the aging time was changed to 96 hours.

(4) Flexural strength: Two polyethylene terephthalate resin sheets each having a thickness of 1.5 mm were provided. Each photoreactive hot-melt adhesive composition was melt coated on an end portion of one resin plate to provide a 300 g/m$^2$ spread thereon and exposed to a 365 nm radiation at an intensity of 50 mW/cm$^2$ using an ultra high-pressure mercury lamp for 30 seconds. Then, the coated end portion of one resin plate was brought into contact with one end portion of the other resin sheet. These resin sheets were heat pressed at 75° C. and 100 N/cm$^2$ for 30 seconds to provide a bonded laminate. Immediately thereafter, its flexural strength was measured according to JIS K 6856 "testing methods for flexural strength of adhesive bonds". Also, a similar bonded laminate was separately provided, aged at 23° C. for 96 hours, and then measured for flexural strength in the similar manner.

TABLE 7

| | UNI-6990 | BEO60E | EPICOAT 4004P | EPICOAT 4010P | UNISAFE DCB 1000 | PTMG 1000 |
|---|---|---|---|---|---|---|
| Ex. 3-1 | 1 | | 16.5 | 10 | 4.5 | |
| Ex. 3-2 | 1 | 1.5 | 15 | 10 | 4.5 | |
| Comp. Ex. 3-1 | 1 | | 16.5 | 10 | | 4.5 |
| Comp. Ex. 3-2 | 1 | 1.5 | 15 | 10 | | 4.5 |

TABLE 8

| | Flexural Strength (Immediately After Sample Preparation) (N/cm$^2$) | Flexural Strength (After Aging) (N/cm$^2$) | Dry Adhesion | Water Resistance | Heat Resistance |
|---|---|---|---|---|---|
| Ex. 3-1 | 117.6 | 147 | Adherend Failure | Adherend Failure | >200° C. |
| Ex. 3-2 | 176.4 | 196 | Adherend Failure | Adherend Failure | >200° C. |
| Comp. Ex. 3-1 | 9.8 | 39.2 | Adherend Failure | Adherend Failure | >200° C. |
| Comp. Ex. 3-2 | 9.8 | 58.8 | Adherend Failure | Adherend Failure | >200° C. |

As apparent from Table 8, the addition of polytetramethylene ether glycol, instead of the copolymer of tetramethylene oxide and propylene oxide, in Comparative Examples 3-1 and 3-2 is found to result in the insufficient flexural strength.

In contrast, the compositions of Examples 3-1 and 3-2 are found to exhibit excellent properties in all items of dry adhesion, water resistance, heat resistance and flexural strength.

EFFECTS OF THE INVENTION

The photoreactive hot-melt adhesive composition in accordance with the present invention contains a bisphenol F epoxy resin that is solid at ordinary temperature; at least one compound (b) selected from the group consisting of a compound represented by the formula (1), a copolymer of tetramethylene oxide and ethylene oxide and a copolymer of tetramethylene oxide and propylene oxide; and a cationic photoinitiator. The cationic photoinitiator is activated upon exposure to a radiation to initiate ring-opening polymerization of the bisphenol F epoxy resin. As a result, the adhesive composition is caused to cure. In summary, the adhesive composition when exposed to a radiation is caused to cure speedily to exhibit the improved flexibility, increased resin strength and excellent bond strength.

In addition, the reaction between the bisphenol F epoxy resin that is solid at ordinary temperature and the compound (b) results not only in the increased resistance of the bonded laminate to hydrophilic liquids but also in the increased heat resistance adhesion thereof.

Accordingly, the photoreactive hot-melt adhesive composition can be provided which exhibits the superior resistance to hydrophilic liquids and the improved heat resistance.

Also, the use of the copolymer of tetramethylene oxide and propylene oxide as the compound (b) results in the effective increase in flexural strength of the bonded laminate.

Also, the use of the copolymer of tetramethylene oxide and ethylene oxide as the compound (b) insures a sufficient pot life of the exposed composition and accordingly enables reconciliation of a fast-curing property and a sufficiently-extended pot life.

The exclusion of polyester that assumes a solid form at ordinary temperature prevents deterioration of the adhesive composition due to hydrolysis.

The invention claimed is:
1. A photoreactive hot-melt adhesive composition containing:

(a) a bisphenol F epoxy resin that is solid at ordinary temperature;

(b) a compound represented by the following formula (1):

R1-(OR2)$_2$—OR3  Formula (1)

wherein, R1 and R3 independently represent any of a hydrogen atom, a glycidyl group and a monofunctional substituted or unsubstituted hydrocarbon group having 1–8 carbon atoms; R2 represents a bifunctional, substituted or unsubstituted hydrocarbon group having 2–8 carbon atoms; and n is an integer of 2 or larger. In (OR2)$_n$, R2's of OR2's may be all identical to or different from each other; and (c) a cationic photoinitiator.

2. The photoreactive hot-melt adhesive composition as recited in claim 1, wherein said compound represented by formula (1) is polytetramethylene ether glycol or polyethylene glycol.

3. The photoreactive hot-melt adhesive composition as recited in claim 1, wherein said compound represented by the formula (1) is not an epoxy compound, and is incorporated into the composition in an amount of 5–40 parts by weight, based on 100 parts by weight of all epoxy resins.

4. The photoreactive hot-melt adhesive composition as recited in claim 1, wherein said compound represented by the formula (1) is an epoxy compound, and is incorporated into the composition in an amount of 5–40 parts by weight, based on 100 parts by weight of all epoxy resins excepting the compound represented by formula (1).

5. The photoreactive hot-melt adhesive composition as recited in claim 1, wherein said compound (b) is incorporated into the composition in an amount of 1–40 parts by weight, based on 100 parts by weight of all epoxy resins.

* * * * *